(12) United States Patent
Bacabara et al.

(10) Patent No.: US 8,354,943 B2
(45) Date of Patent: Jan. 15, 2013

(54) DISPLAY DEVICE FOR AN AIRCRAFT FOR DISPLAYING A PILOTING SYMBOLOGY DEDICATED TO OBSTACLE AVOIDANCE

(75) Inventors: Corinne Bacabara, Le Haillan (FR); Christian Nouvel, Merignac (FR)

(73) Assignee: Thales, Neuilly sur Seine (FR)

( * ) Notice: Subject to any disclaimer, the term of this patent is extended or adjusted under 35 U.S.C. 154(b) by 591 days.

(21) Appl. No.: 12/598,003

(22) PCT Filed: May 21, 2008

(86) PCT No.: PCT/EP2008/056298
§ 371 (c)(1),
(2), (4) Date: Oct. 28, 2009

(87) PCT Pub. No.: WO2008/145594
PCT Pub. Date: Dec. 4, 2008

(65) Prior Publication Data
US 2010/0134323 A1 Jun. 3, 2010

(30) Foreign Application Priority Data
May 25, 2007 (FR) ..................................... 07 03739

(51) Int. Cl.
*G01C 23/00* (2006.01)
(52) U.S. Cl. ........ 340/973; 340/974; 340/975; 340/978; 701/14
(58) Field of Classification Search .................. 340/973, 340/971, 974, 975, 978; 701/14; 345/418
See application file for complete search history.

(56) References Cited

U.S. PATENT DOCUMENTS

| | | | | |
|---|---|---|---|---|
| 4,786,905 | A | * | 11/1988 | Muller .......................... 340/975 |
| 6,057,786 | A | | 5/2000 | Briffe et al. |
| 6,552,669 | B2 | * | 4/2003 | Simon et al. .................. 340/945 |
| 6,879,886 | B2 | * | 4/2005 | Wilkins et al. ..................... 701/3 |
| 7,295,135 | B2 | * | 11/2007 | Younkin ....................... 340/971 |
| 7,444,212 | B2 | * | 10/2008 | Pepitone ........................... 701/3 |
| 2003/0023354 | A1 | | 1/2003 | Brust et al. |
| 2003/0071828 | A1 | | 4/2003 | Wilkins et al. |

FOREIGN PATENT DOCUMENTS

FR     2783500     3/2000

OTHER PUBLICATIONS

U.S. Appl. No. 12/542,008, filed Aug. 17, 2009, Bacabara et al.
U.S. Appl. No. 12/547,595, filed Aug. 26, 2009, Bacabara et al.
U.S. Appl. No. 12/542,114, filed Aug. 17, 2009, Nouvel et al.
U.S. Appl. No. 12/542,965, filed Aug. 18, 2009, Nouvel et al.
U.S. Appl. No. 12/540,920, filed Aug. 13, 2009, Nouvel et al.
U.S. Appl. No. 12/597,957, filed Oct. 28, 2009, Bacabara et al.
U.S. Appl. No. 12/598,060, filed Oct. 29, 2009, Bacabara et al.

* cited by examiner

*Primary Examiner* — Toan N Pham
(74) *Attorney, Agent, or Firm* — Lowe, Hauptman, Ham & Berner, LLP

(57) ABSTRACT

The general field of the invention is, within the framework of the terrain anti-collision systems for aircraft, the presentation on the displays for aiding the piloting and the navigation of a simplified symbology suited to these critical situations. More precisely, the symbols comprise guidance indications in the depictions representing the horizontal and vertical situation indicators as well as speed instructions and altitude instructions, indications relating to the propulsion of the jets as well as guidance messages.

7 Claims, 5 Drawing Sheets

DISPLAY DEVICE FOR AN AIRCRAFT FOR DISPLAYING A PILOTING SYMBOLOGY DEDICATED TO OBSTACLE AVOIDANCE

CROSS-REFERENCE TO RELATED APPLICATIONS

The present Application is based on International Application No. PCT/EP2008/056298, filed on May 21, 2008, which in turn corresponds to French Application No. 0703739, filed on May 25, 2007, and priority is hereby claimed under 35 USC §119 based on these applications. Each of these applications are hereby incorporated by reference in their entirety into the present application.

BACKGROUND OF THE INVENTION

1. Field of the Invention

The field of the invention is that of flight management systems for aircraft comprising a terrain anti-collision system and a collimated viewing device able to present symbologies dedicated to the avoidance of obstacles.

2. Description of the Prior Art

In the aeronautical sector, collisions with the ground without loss of control, commonly called CFITs, the acronym standing for "Controlled Flight Into Terrain", are the prime cause of catastrophic accidents to civilian airplanes. The aeronautical industry is concentrating its efforts on means for reducing and ultimately eliminating all futures CFIT accidents.

For thirty years now, to solve this problem, the aeronautical industry has been developing a tool called GPWS standing for "Ground Proximity Warning System". However, GPWS has no systems for recognizing the situation of the terrain and does not know the relative trajectory of the airplane with respect to the terrain. The ever growing increase in air traffic has given rise to a new growth of CFITs despite the quasi-generalized use of GPWS. Today, CFITs still represent more than 40% of accidents.

The technological advances obtained notably in the development of digitized terrain files, in the precision of positioning by virtue of GPS location and in increased processing power have allowed the development of new concepts making it possible to guard against these risks of collision with the ground. These concepts rely essentially on extrapolation of the current trajectory of the airplane and on a terrain database corresponding to the relief overflown making it possible to predict these risks. These concepts are materialized in the form of a new generation of equipment intended for transport or business planes called TAWS for Terrain Awareness and Warning System. This system is, for example, marketed by the company THALES AVIONICS under the brand name GCAM standing for Ground Collision Avoidance Module.

The GCAM system is described in FIG. 1. It essentially comprises a central electronic computer linked on the one hand to the network of sensors and pick-ups of the aircraft and on the other hand, to the various displays of the instrument panel as well as to the audible alarms disposed in the cockpit by means of a data transmission bus. The sensors are essentially sensors making it possible to determine the position of the craft with respect to the ground, its attitude and its speed. The displays concerned are essentially the Head-Up sight as well as the Head-Down piloting and navigation screens such as the "Navigation Display" and the "Primary Flight Displays".

The dynamic operation of the GCAM is as follows. It monitors the geographical environment of the aircraft. If it finds that there is no risk of terrain threat, near or far, the depictions presented to the pilot and optionally to the copilot are standard for a mission of IFR type, the acronym standing for Instrument Flight Rules or VFR type, the acronym standing for Visual Flight Rules. The system is in a mode termed "NORMAL".

When the system determines that there is a possibility of dangerous terrain along the axis of the aircraft and/or laterally, the system passes to a mode termed "LATERAL PROXIMITY". In this mode, the depictions must allow the pilot to carry out the navigation tasks and to comprehend the situation without ambiguity. The distance from the aircraft to the obstacles is of the order of forty Nautical Miles.

In this case, if the pilot does not react, the airplane approaches dangerously close to the terrain, its trajectory touching the relief. As soon as the time before the collision becomes less than about twelve seconds, the system passes to a mode termed "CAUTION". The audible alarm "TERRAIN TERRAIN" sounds. Alarm messages are also displayed on the screens.

The pilot has understood the situation. He must now act by piloting manually. When he has only about eight seconds left to perform a correct avoidance maneuver, the system passes to a mode termed "WARNING". The proposed avoidance maneuver is either vertical of the type "PULL-UP" or involves a turn of the type "PULL UP-TURN RIGHT" or "PULL UP-TURN LEFT". The audible alarms sound. The messages are also displayed on the screens.

The situation reverts to usual. The obstacle is avoided. The system passes back to the "NORMAL" mode or to the "LATERAL PROXIMITY" mode if it remains in the vicinity of potentially dangerous terrains. The audible alarm "CLEAR OF TERRAIN" sounds. This return to normal is accompanied by a return to a conventional display in the customary operating modes.

The GCAM allows notably the generation of a specific audible alarm or "warning" called "Avoid Terrain" in addition to the conventional "warning" called "Pull Up" which corresponds to a vertical avoidance maneuver. This alarm is engaged when an avoidance maneuver by "Pull-Up" no longer makes it possible to ensure a clearance without collision. The "Avoid Terrain" alarm of the GCAM, though representing a significant advance, does not completely meet pilot expectations. They would like to have an indication of lateral avoidance maneuver when no vertical avoidance maneuver is possible any longer.

During the avoidance maneuvers, the pilot must essentially navigate and pilot his machine manually in the vertical and horizontal planes. These tasks are detailed below:

Navigating:
  Identifying/Grading the dangerous obstacles;
  Analyzing the situation to protect oneself from threats;
  Comprehending the new trajectories proposed by the system.
Piloting the machine in the vertical plane:
  Maintaining attention on the current vertical speed;
  Maintaining attention on the current altitude;
  Maintaining attention on the proximity of the ground;
  Being aware of the attitude of the airplane with respect to the real world;
  Maintaining attention on the speed vector of the airplane;
  Maintaining attention on the angle of attack so as to avoid stalling;
  Maintaining a climb slope.
Piloting the machine in the horizontal plane:

Maintaining attention on the current course followed by the airplane;

Maintaining attention on the current roll of the airplane;

Entering a turn correctly;

Holding a turn correctly;

Exiting a turn correctly;

Maintaining a correct trajectory with respect to a predefined avoidance trajectory.

The instrument panels of modern aircraft comprise so-called Head-Down piloting and navigation display screens such as the "Navigation Display" and the "Primary Flight Display". An exemplary symbology present on a "Primary Flight Display" is represented in FIG. 2. It conventionally comprises:

in its upper part, an aircraft attitude indicator 100 also called the "artificial horizon" surrounded by the airspeed indicator 300, vertical speed indicator and altitude indicator 200;

in its lower part, a heading rose 400 with the conventional indications for course and course deviations.

SUMMARY OF THE INVENTION

The object of the invention is to present on a screen of "Primary Flight Display" type a simplified ergonomic symbology making it possible to improve the perception by the crew of their situation in relation to the terrain and to enable them to comprehend the possible avoidance maneuvers. The information necessary for generating this symbology arises from the calculation algorithms developed within the framework of the functionalities implemented in the GCAM system. These algorithms make it possible to calculate the information necessary to present the information on the navigation screen in real time.

More precisely, the subject of the invention is a viewing device for aircraft comprising means for generating and displaying piloting and navigation symbols, characterized in that the symbols are at least, on the one hand a first symbol representing the current direction of the inertial speed vector and on the other hand a second symbol representing the attitude that must be followed by the aircraft, the symbols being displayed superimposed on the representation of an attitude indicator, of artificial horizon type.

Advantageously, the second symbol represents either a slope instruction, represented graphically by a U whose branches represent the course to be followed by the aircraft, or else the trim-wise and roll-wise command director of the aircraft, depicted graphically by two parallel bars whose inclination and position are representative of the roll and trim to be held by the aircraft.

Advantageously, the symbology comprises a third symbol giving the value of the floor altitude necessary to pass an obstacle, and a fourth arrow-shaped symbol situated in the zone of the speed indicator and indicating the optimal speed for holding a maximum climb slope necessary to pass an obstacle.

Advantageously, the color of the first, of the second, of the third and of the fourth symbol is magenta.

Advantageously, the symbology comprises a fifth symbol which is a scale built into the vertical speed indicator, comprising two zones of different color, a first zone indicating the calculated minimum vertical speeds for passing an obstacle, a second zone indicates the vertical speeds to be avoided.

Advantageously, the horizontal situation indicator or HSI is on the one hand unburdened of all the radionavigation information and on the other hand comprises a sixth symbol corresponding to an advocated course sector, represented by an angular sector centered on the heading rose.

Moreover, the symbology can comprise a seventh symbol consisting of a set of two counters representing the thrusts of the left and right jets of the aircraft and also an eighth symbol consisting of a set of messages enabling the pilot to comprehend the trajectories proposed for guiding the aircraft.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
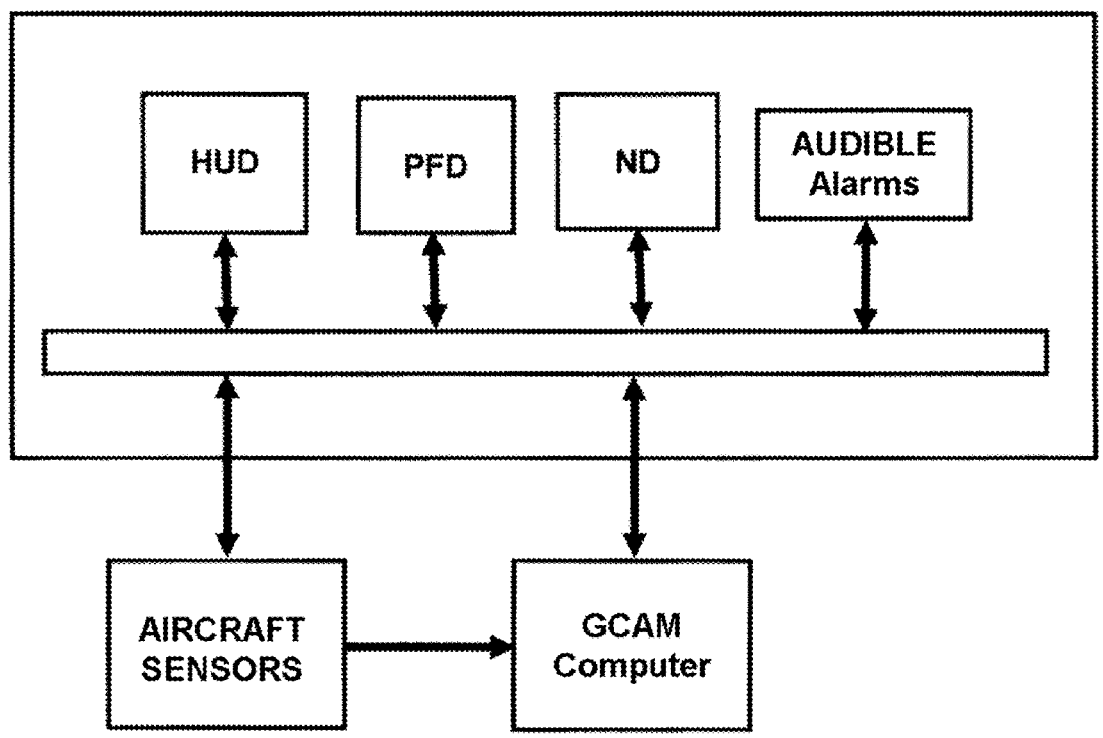
FIG. 1 represents the general schematic of a GCAM system.
Figure 2:
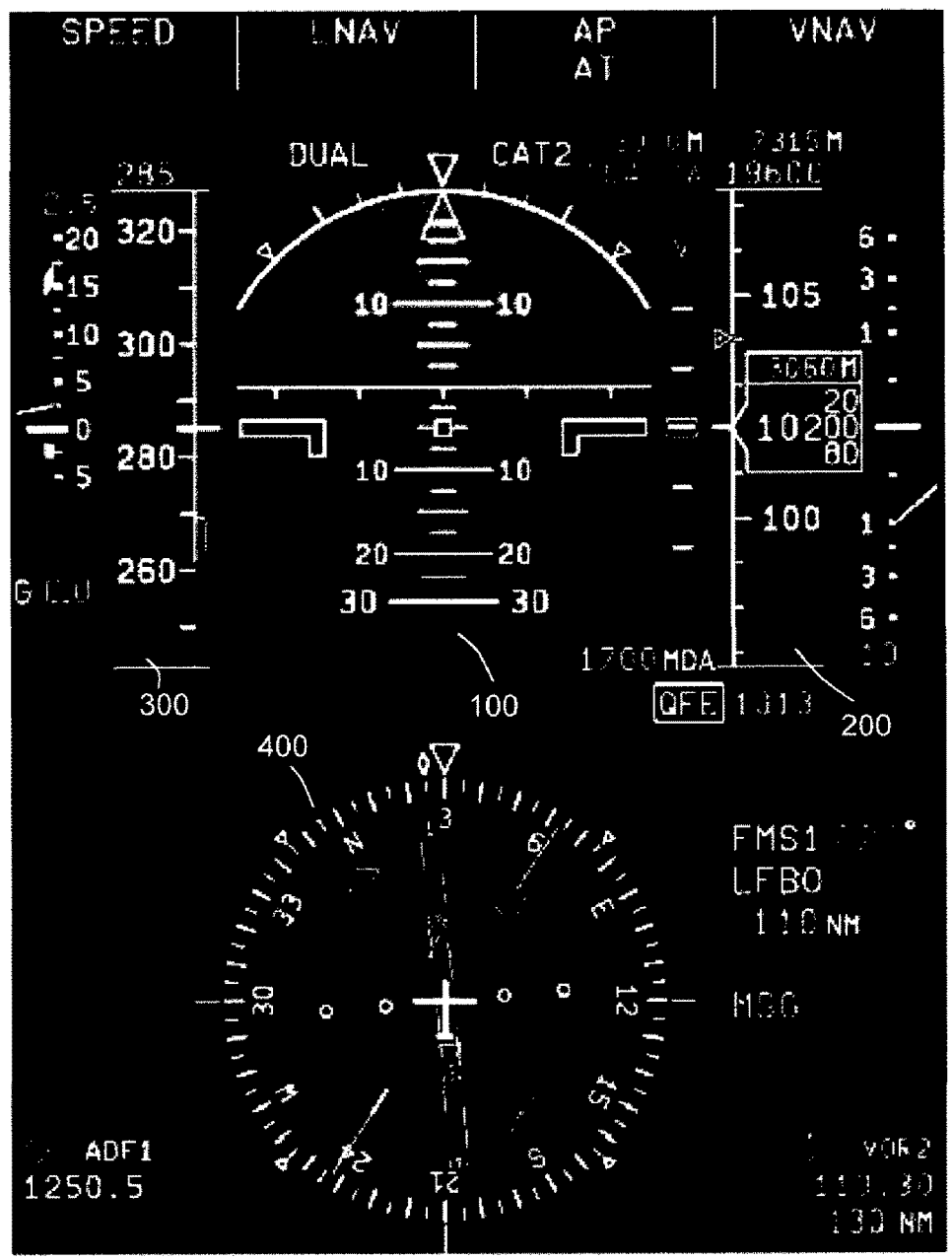
FIG. 2 represents a conventional symbology of a screen of PFD type according to the prior art.
Figure 3:
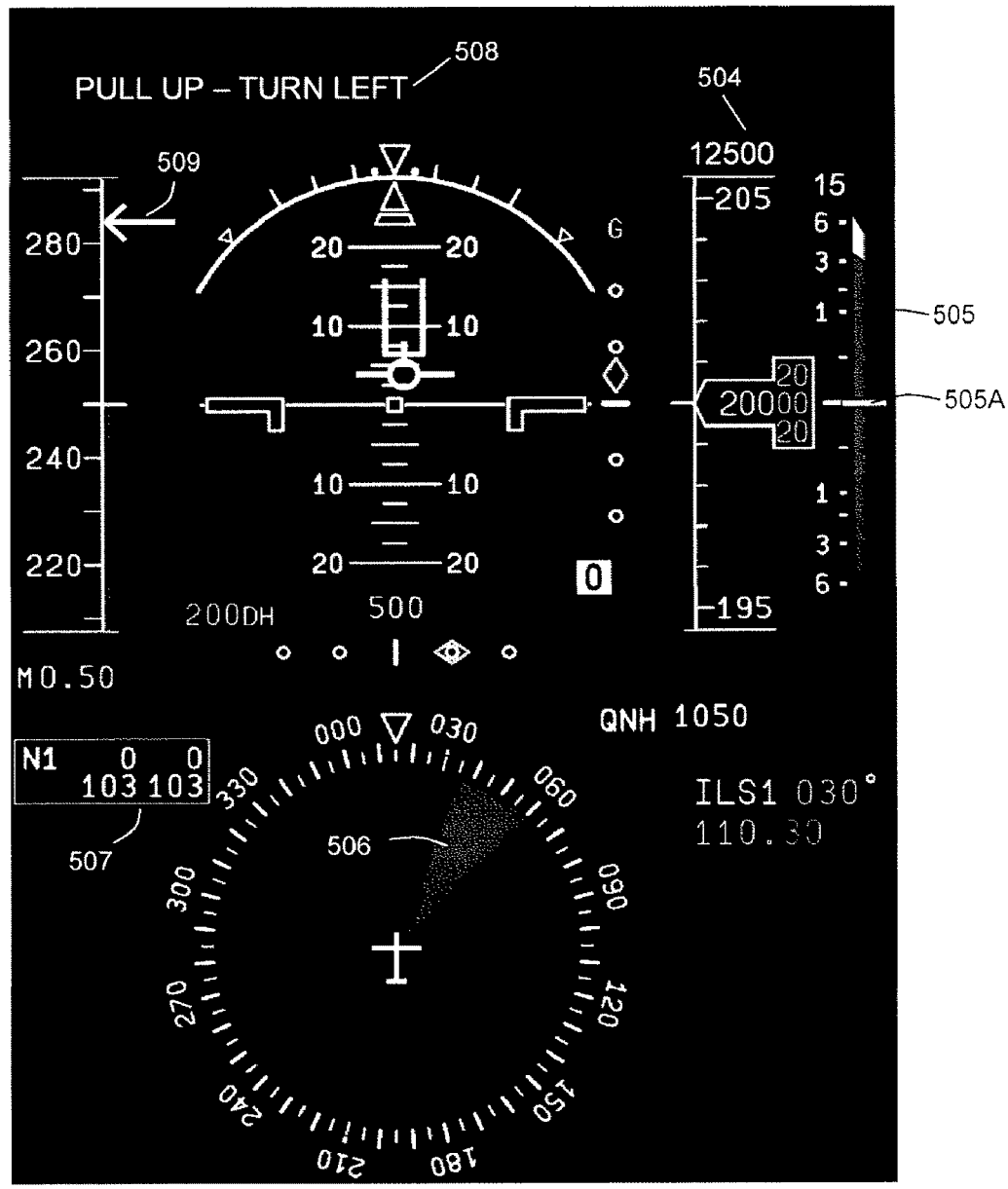
FIG. 3 represents the symbology according to the invention represented in a display of PFD type.
Figure 4:
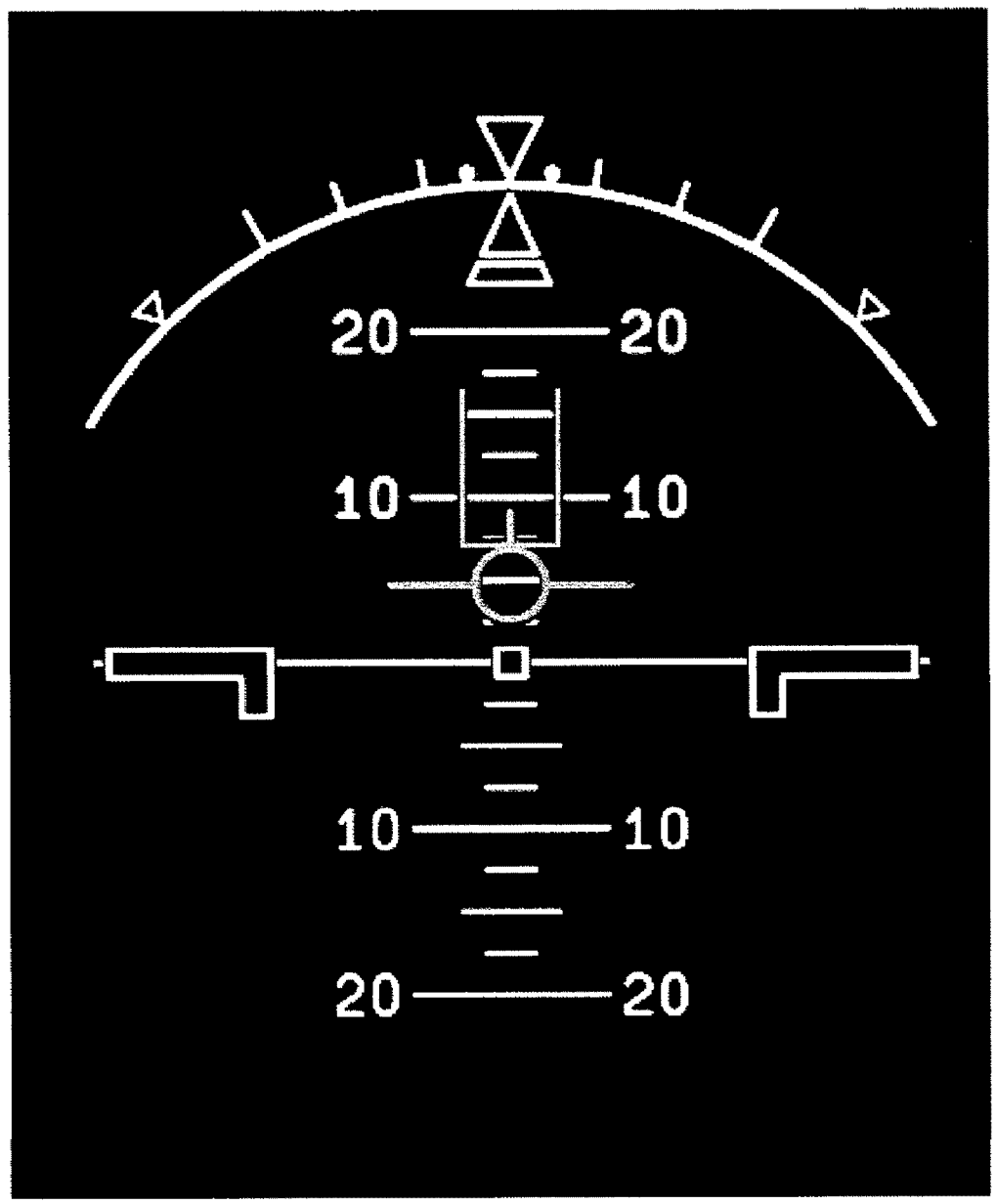
FIG. 4 is an enlargement of the central part of FIG. 3.
Figure 5:
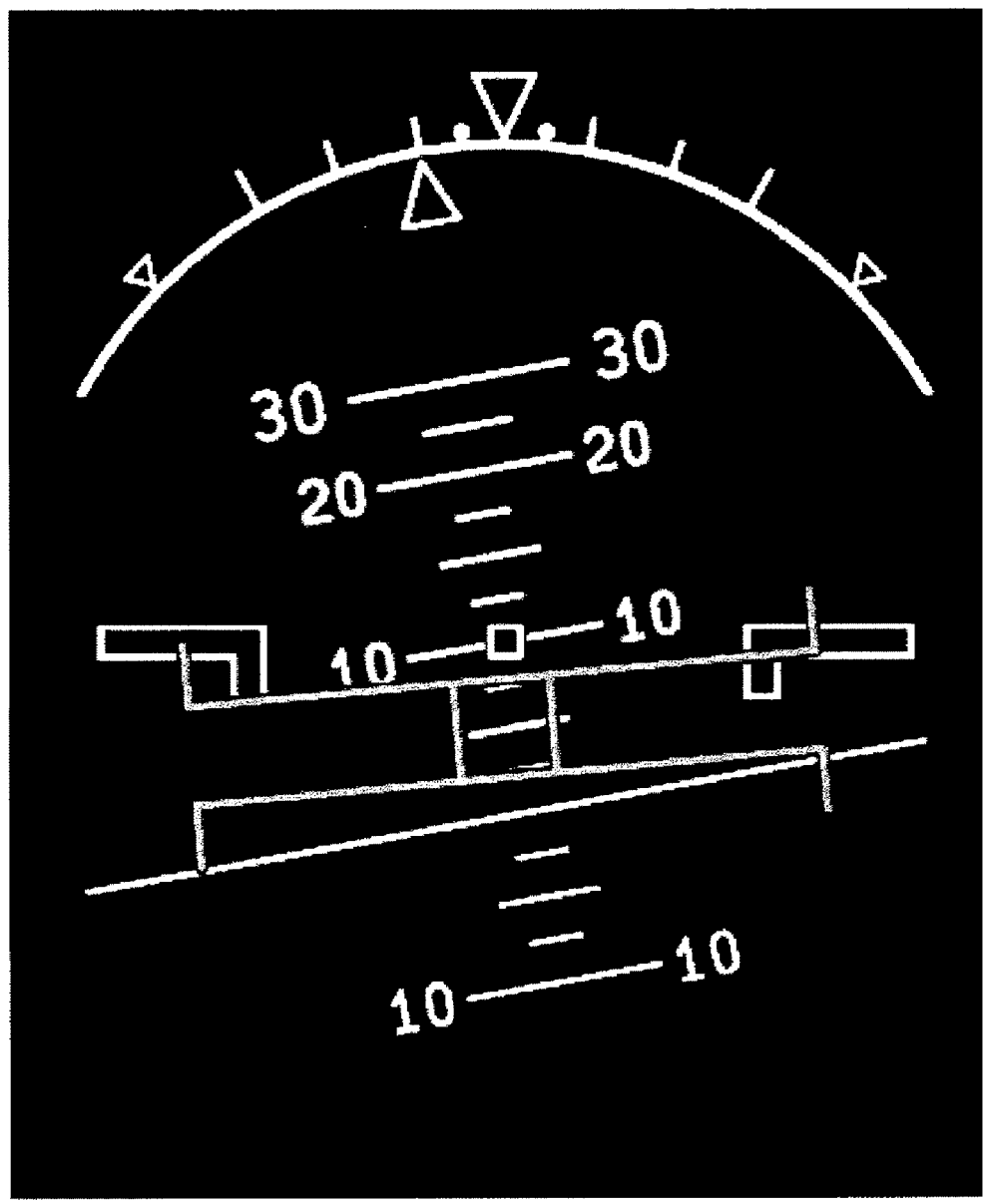
FIG. 5 represents a variant of the symbology represented in FIG. 4.

By way of nonlimiting examples, the novel symbology according to the invention is represented in FIGS. 3, 4 and 5 and is detailed below. Naturally, the symbologies according to the invention can comprise all or some of these symbols and their position and their form are given merely by way of indication.

The first symbology is displayed in the zone of the artificial horizon. It comprises two symbols 501 and 502 representing the attitude that must be adopted by the aircraft. There are two main possible representations of this symbology.

In a first representation shown in FIGS. 3 and 4, the symbology comprises:

a first symbol 501 representing the current direction of the inertial speed vector. The pilot uses this symbol to manage the slope of the trajectory followed by the airplane. It is represented by the conventional symbol of the speed vector, that is to say by a circle extended by two horizontal strokes and surmounted by a vertical stroke supposed to represent the craft as a rear view;

a second symbol 502 representing an instruction of slope and direction to be held calculated in real time. The pilot must maintain his craft so as to place the speed vector in this zone. The limits of this zone are represented by a U. If the bars of the U exit the field of the horizon, they are represented, in this case, dotted.

In a second representation shown in FIG. 5, the symbol 502 is replaced with the symbol 503 which indicates the zone in which the pilot must place the wings of the craft, this symbol corresponds to the trim-wise and roll-wise command director. It essentially comprises two parallel identical bars whose inclination corresponds to the roll of the craft and whose position with respect to the horizon line corresponds to its trim. The dimensions of this symbol are calculated as a function of margins related to manual piloting. Conventionally, the trim and the roll must be held to within a degree. This symbol is used for conventional airplanes not protected by electric flight controls. It is easier for a pilot to manage these two primary parameters.

The third symbol 504 gives the value of the floor altitude calculated to pass an obstacle. It is situated above the altitude indicator. The calculation takes account of the performance of the airplane and of its current configuration, in particular of the position of the flaps and of the landing gear. The altitude is expressed in feet by a five-digit counter whose last digit is always a zero.

The fourth symbol 509 is an arrow situated in the zone of the speed indicator and indicating the optimum speed expressed in knots calculated by the GCAM system to hold a maximum climb slope necessary to pass an obstacle. The calculation takes account of the performance of the airplane and of the current configuration.

The color of these various symbols 501, 502, 503, 504 and 509 is magenta.

The fifth symbol 505 is a scale built into the vertical speed indicator, generally expressed in feet per minute. This scale comprises two zones of different color. A first zone indicates the calculated minimum vertical speeds for passing an obstacle. A second zone indicates the vertical speeds to be avoided. The calculation of the position of the first zone takes account of the performance of the airplane, of the current configuration corresponding to the position of the flaps and of the undercarriage and of the nearby obstacles. The pilot must place the white needle 505A of the vertical speed indicator which represents the current vertical speed of the aircraft in the first zone. The first zone is preferably green in color and the second zone amber in color.

The sixth symbol 506 is situated in the zone termed HSI, the acronym standing for Horizontal Situation Indicator; it corresponds to the course sector advocated by the GCAM system. It is represented by an angular sector centered on the heading rose. The angle at the center of this angular sector has a minimum value of ten degrees for reasons of manual piloting performance enabling a heading to be held to within five degrees either side of the axis of the aircraft. The heading rose is unburdened of all the information of radionavigation type such as the indications of VOR, of ADF and ILS. The sector is preferably colored green.

The seventh symbol 507 is a set of two counters representing the thrusts of the left and right jets. The counters comprise three digits and correspond to the percentage of the maximum possible thrusts. Thus, the pilot can have this item of information without having to search for it on his multifunction screen. In the critical clearance phase which is necessarily stressful and which must take place in a short time, the pilot no longer has to turn his head towards the motive equipment and his workload is thus minimized.

The eighth symbol 508 is a set of messages enabling the pilot to comprehend the proposed trajectories. By way of examples, the following messages of "caution" type are available. These messages are amber in color:
CLEAR OF TERRAIN
CAUTION
The following messages of "warning" type are available:
PULL UP
PULL UP-TURN RIGHT
PULL UP-TURN LEFT
AVOID TERRAIN
AVOID TERRAIN-TURN RIGHT
AVOID TERRAIN-TURN LEFT These messages are written in red. All the messages are centered on the line except for those which contain turn instructions such as TURN LEFT or RIGHT. They are then positioned on the right or on the left of the screen following the direction of turn to be performed. It is possible to arrange them below the messages of the automatic piloting zone.

This symbology can be applied to a large number of aircraft. The types of aircraft concerned may equally well be rotary-wing or fixed-wing aircraft in meteorological conditions of VMC/IMC type, the acronyms standing for Visual Meteorological Conditions and Instrumental Meteorological Conditions and under flight rules of IFR/VFR type.

However, it applies most particularly to commercial aviation with passenger transports and to cargo planes in cruising flight conditions with departure and arrival at appropriately kitted-out aerodromes with a sufficient altitude or one that is low with respect to the surrounding natural obstacles. It also applies to special civilian security or fire missions in low-altitude flight conditions with departure and arrival at appropriately kitted-out aerodromes as well as at makeshift airfields.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A viewing device for aircraft comprising: an apparatus configured to generate and display piloting and navigation symbols,
    wherein the symbols include at least
    a symbol representing a current direction of an inertial speed vector,
    a symbol representing a trim-wise and roll-wise command director of the aircraft,
    depicted graphically by two parallel bars whose inclination and position are representative of a roll and a trim to be held by the aircraft, and
    a symbol corresponding to an advocated course sector, represented by an angular sector centered on a heading rose,
    said symbols are displayed superimposed on the representation of an attitude indicator, of artificial horizon type,
    and a horizontal situation indicator is unburdened of all radionavigation information.

2. The viewing device as claimed in claim 1, wherein the symbols further comprise a symbol giving a value of a floor altitude necessary to pass an obstacle.

3. The viewing device as claimed in claim 2, wherein the symbols further comprise a arrow-shaped symbol situated in a zone of a speed indicator and indicating an optimal speed for holding a maximum climb slope necessary to pass an obstacle.

4. The viewing device as claimed in claim 3, wherein a color of the symbol representing the current direction of the inertial speed vector, of the symbol representing the trim-wise and roll-wise command director of the aircraft, of the symbol giving the value of the floor altitude necessary to pass the obstacle, and of the arrow-shaped symbol is magenta.

5. The viewing device as claimed in claim 1, wherein the symbols further comprise a symbol which is a scale built into the vertical speed indicator, comprising two zones of different color, a first zone indicating calculated minimum vertical speeds for passing an obstacle, a second zone indicating vertical speeds to be avoided.

6. The viewing device as claimed in claim 1, wherein the symbols further comprise a symbol including a set of two counters representing thrusts of left and right jets of the aircraft.

7. The viewing device as claimed in claim 1, wherein the symbols further comprise a symbol including a set of messages enabling a pilot to comprehend trajectories proposed for guiding the aircraft.

* * * * *